(12) United States Patent
Sun et al.

(10) Patent No.: US 10,763,984 B2
(45) Date of Patent: Sep. 1, 2020

(54) FREQUENCY DIVISION MULTIPLEXING SYNCHRONIZATION SIGNALS (SS) FOR WIDEBAND OPERATION

(71) Applicant: QUALCOMM Incorporated, San Diego, CA (US)

(72) Inventors: Haitong Sun, Cupertino, CA (US); Hung Ly, San Diego, CA (US); Tingfang Ji, San Diego, CA (US); Peter Gaal, San Diego, CA (US); Alexei Yurievitch Gorokhov, San Diego, CA (US); Tao Luo, San Diego, CA (US); Muhammad Nazmul Islam, Edison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/007,704

(22) Filed: Jun. 13, 2018

(65) Prior Publication Data
US 2019/0058538 A1 Feb. 21, 2019

Related U.S. Application Data

(60) Provisional application No. 62/547,726, filed on Aug. 18, 2017, provisional application No. 62/549,402, filed on Aug. 23, 2017.

(51) Int. Cl.
*H04J 1/06* (2006.01)
*H04B 7/06* (2006.01)
(Continued)

(52) U.S. Cl.
CPC .............. *H04J 1/06* (2013.01); *H04B 7/0413* (2013.01); *H04B 7/0695* (2013.01); *H04B 7/088* (2013.01);
(Continued)

(58) Field of Classification Search
CPC ..... H04J 1/06; H04B 7/0413; H04W 74/0891
See application file for complete search history.

(56) References Cited

U.S. PATENT DOCUMENTS

| 2010/0142461 A1* | 6/2010 | Miki | H04B 1/713 370/329 |
| 2015/0173004 A1* | 6/2015 | Nigam | H04W 48/16 370/331 |

(Continued)

OTHER PUBLICATIONS

Huawei Hisilicon: "Design of FDM for carrier with 100% MBSFN subframe allocation", 3GPP Draft, R1-1612823, 3rd Generation Partnership Project (3GPP), Mobile Competence Centre, 650, Route Des Lucioles, F-06921 Sophia-Antipolis Cedex, France vol. RAN WG1, No. Reno, USA, Nov. 14, 2016-Nov. 18, 2016 Nov. 13, 2016 (Nov. 13, 2016), XP051176765, 3 Pages, Retrieved from the Internet: URL:http://www.3gpp.org/ftp/Meetings 3GPP_SYNC/RAN1/ Docs/ [retrieved on Nov. 13, 2016].
(Continued)

*Primary Examiner* — Kabir A Timory
(74) *Attorney, Agent, or Firm* — Patterson & Sheridan, L.L.P.

(57) ABSTRACT

Aspects of the present disclosure relate to techniques for transmitting and processing synchronization signals (SS) for different purposes. In some cases, transmitting multiple SS blocks simultaneously using frequency division multiplexing (FDM), and possibly different beams, may allow a UE to reduce a measurement window.

19 Claims, 11 Drawing Sheets

(51) Int. Cl.
  *H04B 7/08* (2006.01)
  *H04L 5/00* (2006.01)
  *H04W 56/00* (2009.01)
  *H04B 7/0413* (2017.01)
  *H04W 74/08* (2009.01)
  *H04B 7/26* (2006.01)

(52) U.S. Cl.
  CPC .......... *H04L 5/0023* (2013.01); *H04L 5/0048* (2013.01); *H04L 5/0064* (2013.01); *H04W 56/0015* (2013.01); *H04W 74/0891* (2013.01); *H04B 7/2615* (2013.01); *H04L 5/001* (2013.01); *H04L 5/0091* (2013.01)

(56) References Cited

U.S. PATENT DOCUMENTS

| | | | |
|---|---|---|---|
| 2015/0304932 A1 | 10/2015 | Wei et al. | |
| 2017/0070991 A1* | 3/2017 | Subramanian | H04W 16/28 |
| 2017/0201968 A1* | 7/2017 | Nam | H04W 4/70 |
| 2018/0035396 A1* | 2/2018 | Stirling-Gallacher | H04B 7/028 |

OTHER PUBLICATIONS

NTT Docomo et.al., Physical Channels and Multiplexing in Evolved UTRA Downlink, 3GPPTSG RAN WG1 #42 on LTE R1-050707, 3GPP, Aug. 29, 2005, 15 Pages.

NTT Docomo: "Physical Channel Structures for Evolved UTRA", 3GPP Draft, R1-050464, Physical Channel, 3rd Generation Partnership Project (3GPP), Mobile Competence Centre, 650, Route Des Lucioles, F-06921 Sophia-Antipolis Cedex France, vol. RAN WG1, No. Athens, Greece; May 3, 2005, May 3, 2005 (May 3, 2005), XP050100152, pp. 1-13.

Partial International Search Report—PCT/US2018/044652—ISA/EPO—dated Oct. 15, 2018.

Huawei et al., "Discussion and Evaluation on Broadcast Channel/Signals Transmission for Beam Based Initial Access", 3GPP Draft, R1-1701722, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 12, 2017, XP051208888, 6 Pages, Retrieved from the Internet: URL:http://www.3gpp.org/ftp/Meetings_3GPP_SYNC/RAN1/Docs/ [retrieved on Feb. 12, 2017].

International Search Report and Written Opinion—PCT/US2018/044652—ISA/EPO—dated Jan. 25, 2019.

Mediatek Inc: "TDM Based Unified SS Block Design: Signal Structureand Performance", 3GPP Draft, R1-1702727, 3rd GenerationPartnership Project (3GPP), Mobile Competence Centre, 650, Route Des Lucioles, F-06921, vol. RAN WG1, No. Athens, Greece, Feb. 12, 2017, XP051209874, 6 Pages, Retrieved from the Internet: URL:http://www.3gpp.org/ftp/Meetings_3GPP_SYNC/RAN1/Docs/ [retrieved on Feb. 12, 2017].

Xiaomi: "Discussion on NR Paging Design", 3GPP Draft, R1-1700865, 3rd Generation Partnership Project (3GPP), Mobile Competence Centre, 650, Route Des Lucioles, F-06921 Sophia-Antipolis Cedex, France, vol. RAN WG1, No. Reno, USA, Jan. 16, 2017, XP051208382, 3 Pages, Retrieved from the Internet:URL:http://www.3gpp.org/ftp/Meetings_3GPP_SYNC/RAN1/Docs/ [retrieved on Jan. 16, 2017].

* cited by examiner

FREQUENCY DIVISION MULTIPLEXING SYNCHRONIZATION SIGNALS (SS) FOR WIDEBAND OPERATION

CLAIM OF PRIORITY UNDER 35 U.S.C. § 119

This application claims the benefit of U.S. Provisional Patent Application Ser. No. 62/547,726, filed Aug. 18, 2017, and U.S. Provisional Patent Application Ser. No. 62/549,402, filed Aug. 23, 2017, both of which are herein incorporated by reference in its entirety.

INTRODUCTION

Aspects of the present disclosure relate to wireless communications, and more particularly, to the use of synchronization signals (SS) for different purposes, including beam selection and management.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

As described herein, certain wireless systems may employ directional beams for transmission and reception.

Certain aspects of the present disclosure provide a method for wireless communication that may be performed, for example, by a network entity. The method generally includes identifying one or more time intervals for transmitting synchronization signal (SS) blocks for one or more user equipments (UEs) to use for at least one of initial access or measurement purposes and transmitting, within one of the time intervals, SS blocks at different frequency locations using frequency division multiplexing (FDM).

Certain aspects of the present disclosure provide a method for wireless communication that may be performed, for example, by a UE. The method generally includes receiving, within one of time intervals, synchronization signal (SS) blocks transmitted at different frequency locations using frequency division multiplexing (FDM) and performing at least one of initial access or measurement based on the SS blocks.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
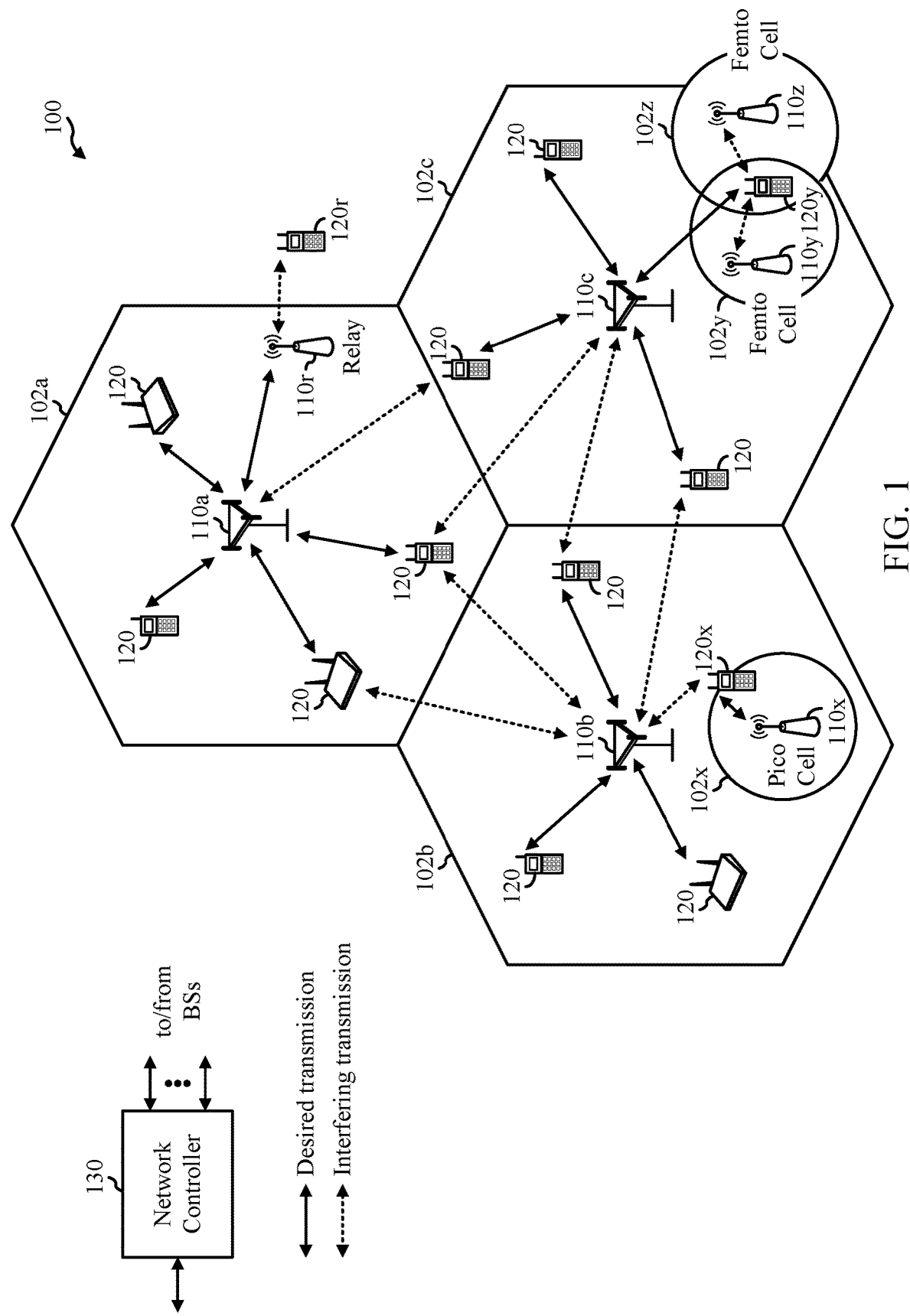
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate using beam-formed transmissions. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless System

FIG. 1 illustrates an example wireless network 100 in which aspects of the present disclosure may be performed.

Figure 8:
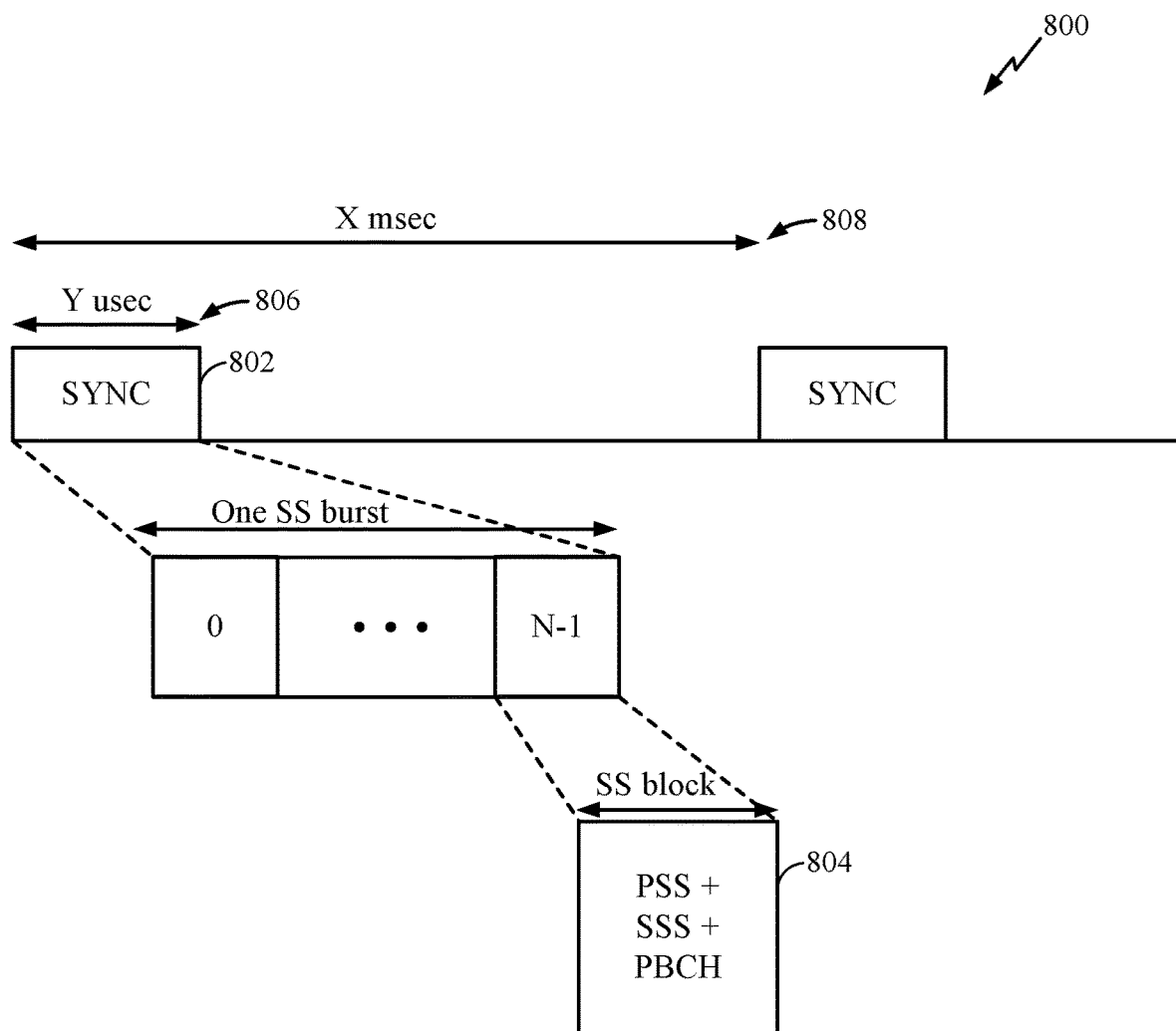
FIG. 8 example transmission timeline of synchronization signals for a new radio telecommunications system, in accordance with aspects of the present disclosure.

According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 8. A receiving entity may use receiver beamforming to receive the transmitted signaling.

In order to more efficiently use resources and conserve power when communicating using beamforming, the UEs 120 may be configured to perform the operations 900 and methods described herein for UE receiver beamforming. BS 110 may comprise a transmission reception point (TRP), Node B (NB), 5G NB, access point (AP), new radio (NR) BS, Master BS, primary BS, etc.). The NR network 100 may include the central unit.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
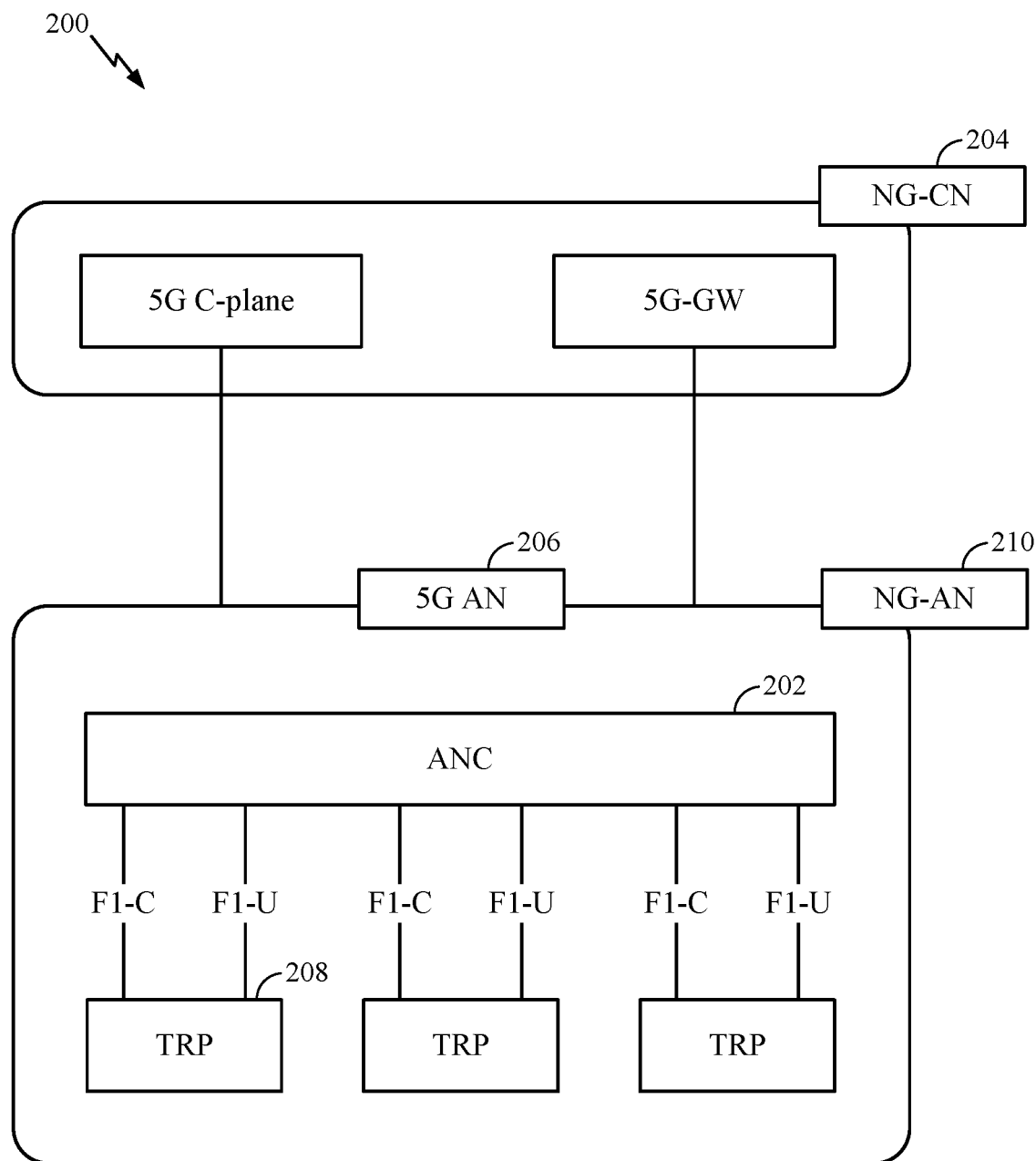
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
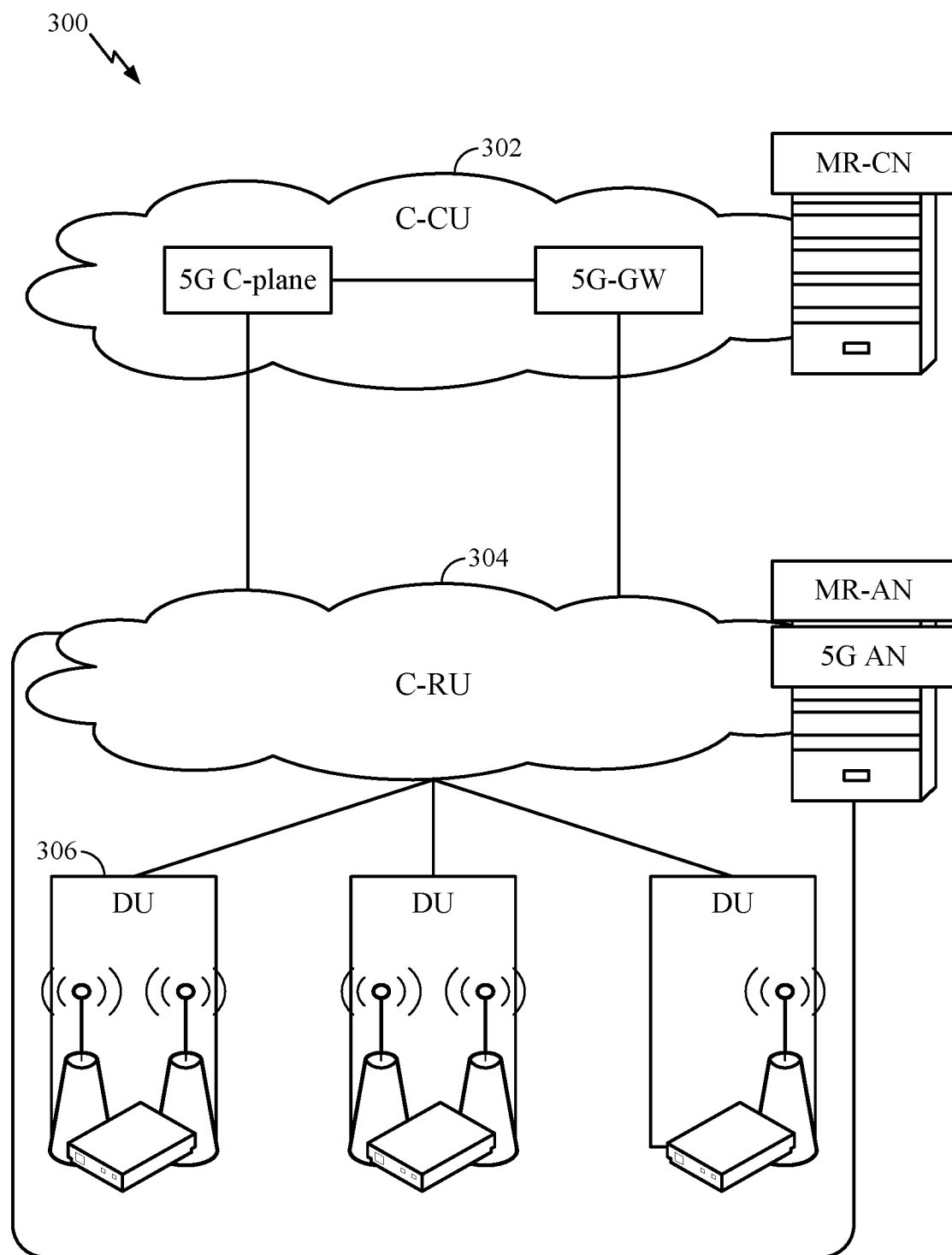
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
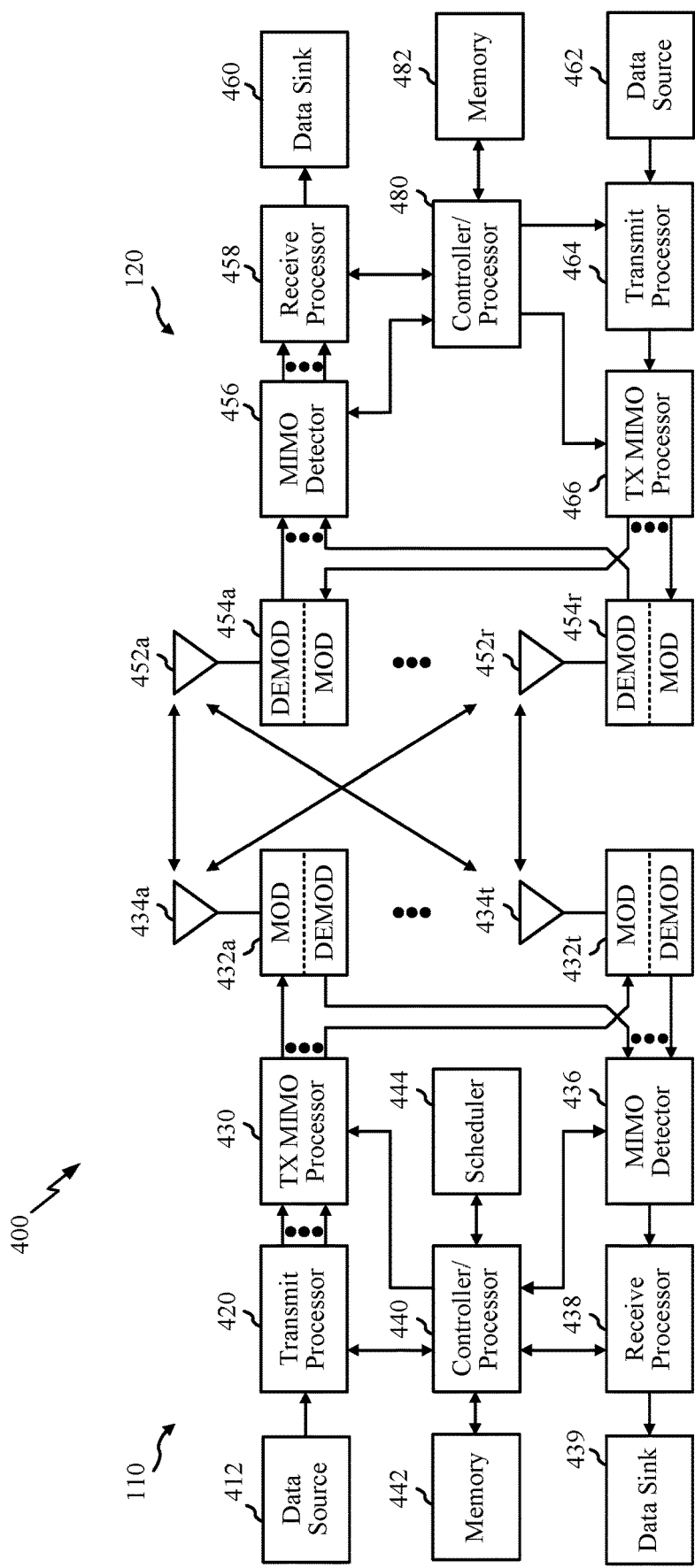
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be used to perform the operations described herein and illustrated with reference to FIGS. 9 and 11-12. According to an example, antennas 434, DEMOD/MOD 432, processors 430, 420, 438 and/or controller/processor 440 of the BS 110 may be used to perform the operations described herein and illustrated with reference to FIGS. 10-12.

As an example, one or more of the antennas 452, DEMOD/MOD 454, processors 466, 458, 464, and/or controller/processor 480 of the UE 120 may be configured to perform the operations described herein for UE beam-based tagging. Similarly, one or more of the 434, DEMOD/MOD 432, processors 430, 420, 438 and/or controller/processor 440 of the BS 110 may be configured to perform the operations described herein.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIGS. 9 and 10, and/or other processes for the techniques described herein and those illustrated in the appended drawings. The processor 440 and/or other processors and modules at the BS 110 may perform or direct processes for the techniques described herein and those illustrated in the appended drawings. The memories 442 and 482 may store data and program codes for the BS 110 and the UE 120, respectively.

Figure 5:
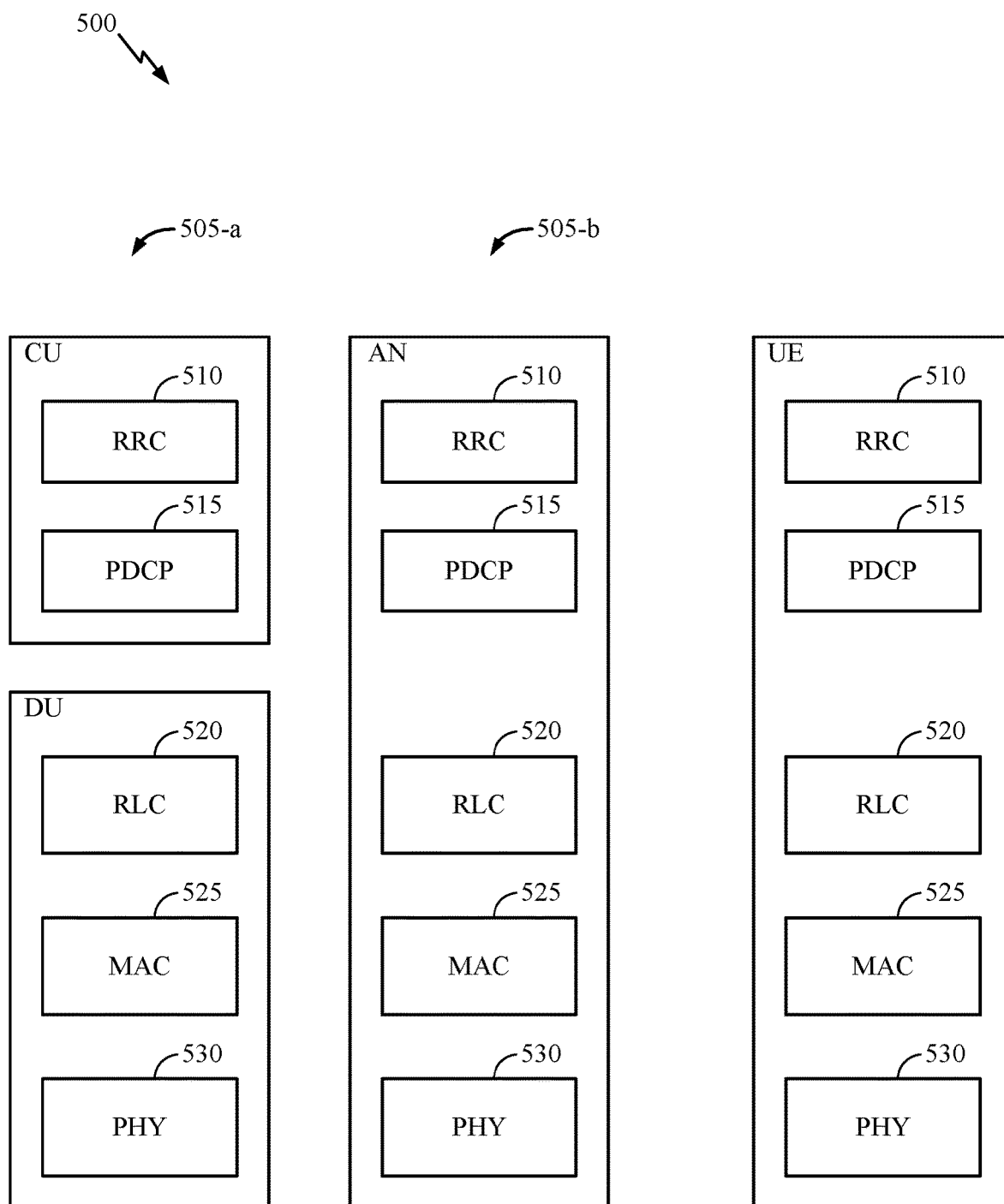
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
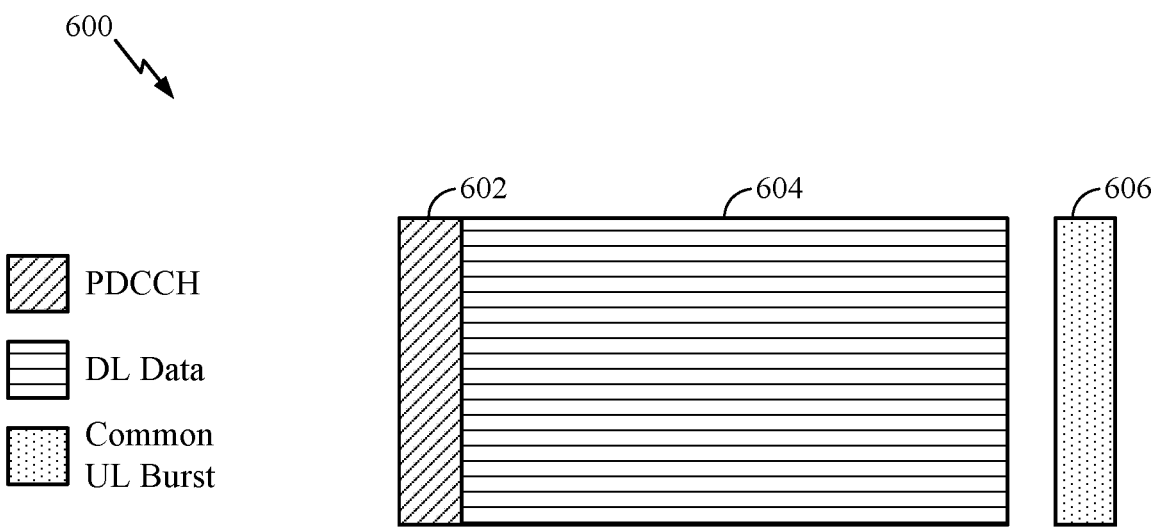
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
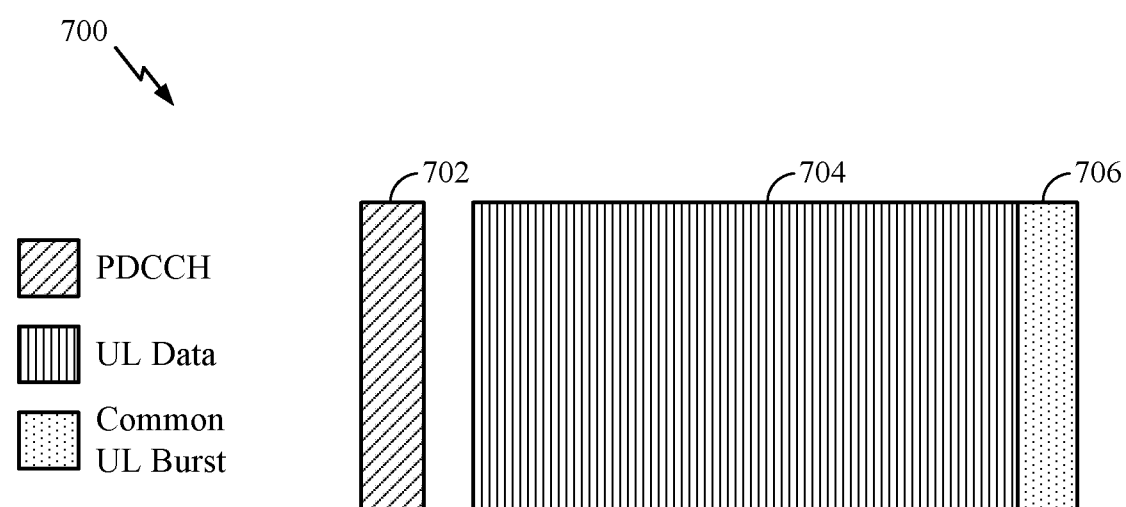
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Synchronization Signal Block Design

Under 3GPP's 5G wireless communication standards, a structure has been defined for NR synchronization (synch) signals (NR-SS), also referred to as NR synchronization channels. Under 5G, a set of consecutive OFDM symbols carrying different types of synch signals (e.g., primary synchronization signal (PSS), secondary synchronization signal (SSS), time synchronization signal (TSS), PBCH) forms an SS block. In some cases, a set of one or more SS blocks may form an SS burst. In addition, different SS blocks may be transmitted on different beams to achieve beam-sweeping for synch signals, which may be used by a UE to quickly identify and acquire a cell. Further, one or more of the channels in an SS block may be used for measurements. Such measurements may be used for various purposes such as radio link management (RLM), beam management, etc. For example, a UE may measure the cell quality and report the quality back in the form of a measurement report, which may be used by the base station for beam management and other purposes.

FIG. 8 illustrates an example transmission timeline 800 of synchronization signals for a new radio telecommunications system, in accordance with aspects of the present disclosure. A BS, such as BS 110 shown in FIG. 1, may transmit an SS burst 802 during a period 806 of Y μsec, in accordance with certain aspects of the present disclosure. Operations 800 begin, at 802, by transmitting a synchronization signal (SS) burst. The SS burst may include N SS blocks 804 with indices of zero to N−1, and the BS may transmit different SS blocks of the burst using different transmit beams (e.g., for beam-sweeping). Each SS block may include, for example, a primary synchronization signal (PSS), a secondary synchronization signal (SSS), and one or more physical broadcast channels (PBCHs), also referred to as synchronization channels. The BS may transmit SS bursts on a periodic basis, with a period 808 of X msec.

Figure 9:
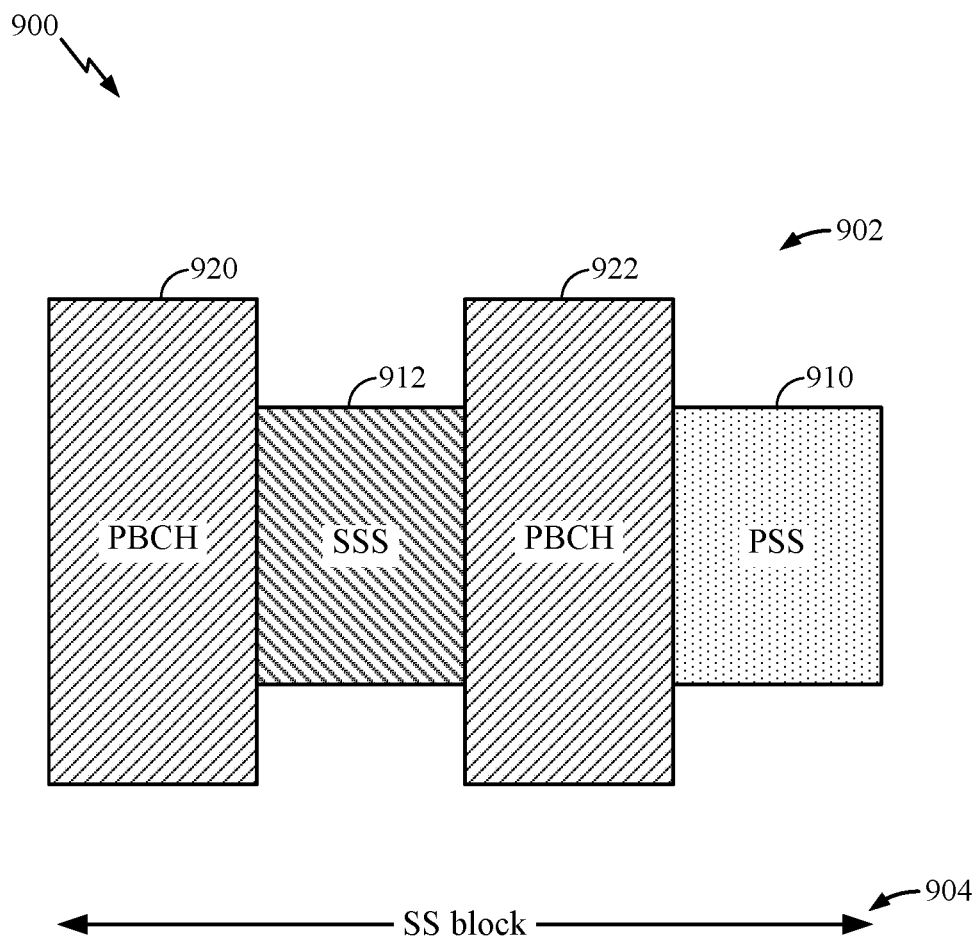
FIG. 9 illustrates an example resource mapping for an exemplary SS block, in accordance with aspects of the present disclosure.

FIG. 9 illustrates an example resource mapping 900 for an exemplary SS block 902, in accordance with aspects of the present disclosure. The exemplary SS block may be transmitted by a BS, such as BS 110 in FIG. 1, over a period 904 (e.g., Y μsec, as shown in FIG. 8). The exemplary SS block includes a PSS 910, an SSS 912, and two PBCHs 920 and 922, although the disclosure is not so limited, and an SS block may include more or fewer synchronization signals and synchronization channels. As illustrated, a transmission bandwidth (B1) of the PBCHs may be different from a transmission bandwidth (B2) of the synchronization signals. For example, the transmission bandwidth of the PBCHs may be 288 tones, while the transmission bandwidth of the PSS and SSS may be 127 tones.

As shown in FIG. 9, SS block consists of PSS, SSS and PBCH (and DMRS for PBCH). These signals are multiplexed in time-domain. There are different synchronization modes: initial acquisition in standalone, initial acquisition in non-standalone, and Synchronization in idle or connected modes.

Example FDM of SS Blocks for Wideband Operation

Aspects of the present disclosure provide techniques that utilize frequency division multiplexing (FDM) to simultaneously transmit multiple SS blocks in different frequency locations. By using different transmit beams to transmit the different SS blocks, UE measurement windows may be reduced, which may lead to enhanced performance (e.g., via quicker beam refinement) and/or reduced power consumption.

FDM generally refers to a process by which a total bandwidth that is available in a communications platform is divided into a series of sub-bands. The division typically occurs such that the sub-bands do not overlap. As such, each of the sub-bands carry a separate signal within the sub-band. As will be described herein, using FDM, different SS blocks may be sent simultaneously (using a same beam or different beams) using different frequency resources, such as different component carriers (CCs).

Due to standards that are being created by the wireless industry, such as 5G, a different number of SS blocks (transmitted using different beams) may be supported for different operating bandwidths. For example, certain design targets may allow for 4 SS blocks (beams) for frequency bands below 3 GHz. For frequency bands between 3 and 6 GHz, a maximum of 8 SS blocks (beams) may be supported. For frequency bands over 6 GHz, 64 SS blocks (beams) may be supported.

A gNB (scheduler), may decide that particular SS blocks should be transmitted or may not be transmitted. The decision may be based on a number of factors, such as how rapidly channel conditions are changing that would prompt beam refinement.

In some cases, a gNB may be able to transmit (SS blocks using) multiple beams simultaneously. For example, a gNB may have multiple antenna panels. The panels, for example, can allow a gNB to transmit using different frequency resources (e.g., >6 GHz, sub 6 GHz, mmW) and/or in different directions (using different ports or beams).

By having a BS use FDM to transmit multiple SS blocks in different directions, aspects of the present disclosure may enable a UE may be able to reduce SS block measurement windows. Reducing the measurement windows, allowing the UE to finish measurements in as short a time as possible, may be beneficial in many cases (e.g., resulting in quicker initial access and/or quicker measurement and reporting which may lead to improved system performance and reduced power consumption).

To reduce the UE measurement window, a gNB can sweep multiple beams (frequencies) at the same time while a wideband UE can measure multiple beams (sent using different frequency resources) simultaneously. The methods provided herein also provide a mechanism wherein a system receives capability information indicating one or more UE are capable of wideband processing. In response, the network may transmit SS blocks, via multiple beams, using FDM based on the capability information. Such information may be sent by the UE to the system upon receipt of the SS block, as a non-limiting example.

The system may also provide for signaling to the one or more UEs that SS blocks are transmitted using FDM. Such signaling may also include an indication of what resources are used for transmitting which SS blocks, in which symbols, for example, as a mapping between SS block indices and beams. Using this information, the network and UE may be in synch regarding what resources are used to transit which SS blocks, allowing the UE to properly report the measurements.

This information may be signaled to a UE, for example, as (cell-specific) system information, such as remaining minimum system information (RMSI) or other system information (OSI). As an alternative, this information could be delivered via UE-specific signaling, such as radio resource control (RRC) signaling.

As will be described in greater detail below, in some cases, the information signaled to a UE may provide an indication of what SS block measurements may be used to replace other SS block measurements. As will be described in greater detail below, such information may be referred to as measurement correspondence information (e.g., meaning a UE can perform measurement of one such SS block as an alternative to another corresponding SS block). This information, also, may be signaled to a UE, as system information or via RRC signaling.

Figure 10:
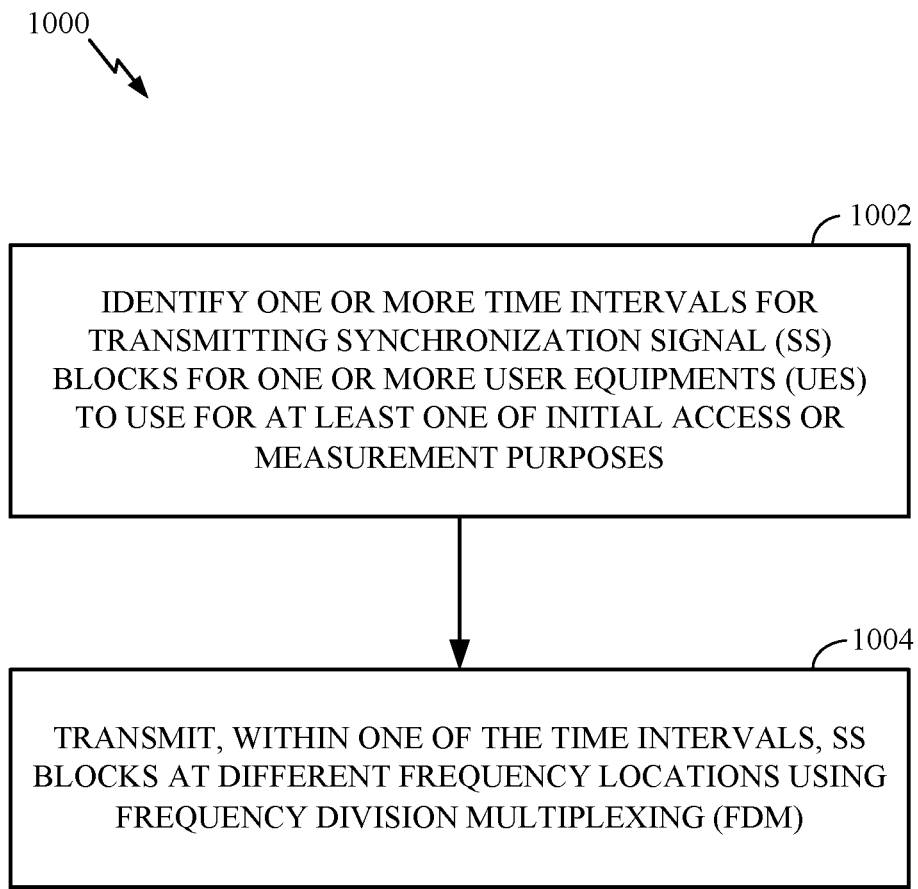
FIG. 10 illustrates example operations that may be performed by a network entity, in accordance with certain aspects of the present disclosure.

FIG. 10 illustrates example operations 1000 that may be performed by a network entity, in accordance with certain aspects of the present disclosure. Operations 1000 may be performed, for example, by a base station (e.g. a gNB) designed to participate in beamformed communications with one or more UE's.

Operations 1000 being, at 1002 by identifying one or more time intervals for transmitting synchronization signal (SS) blocks for one or more user equipments (UES) to use for at least one or initial access or measurement purposes. At 1004, the network entity transmits, within one of the time intervals, SS blocks at different frequency locations using frequency division multiplexing (FDM).

Figure 11:
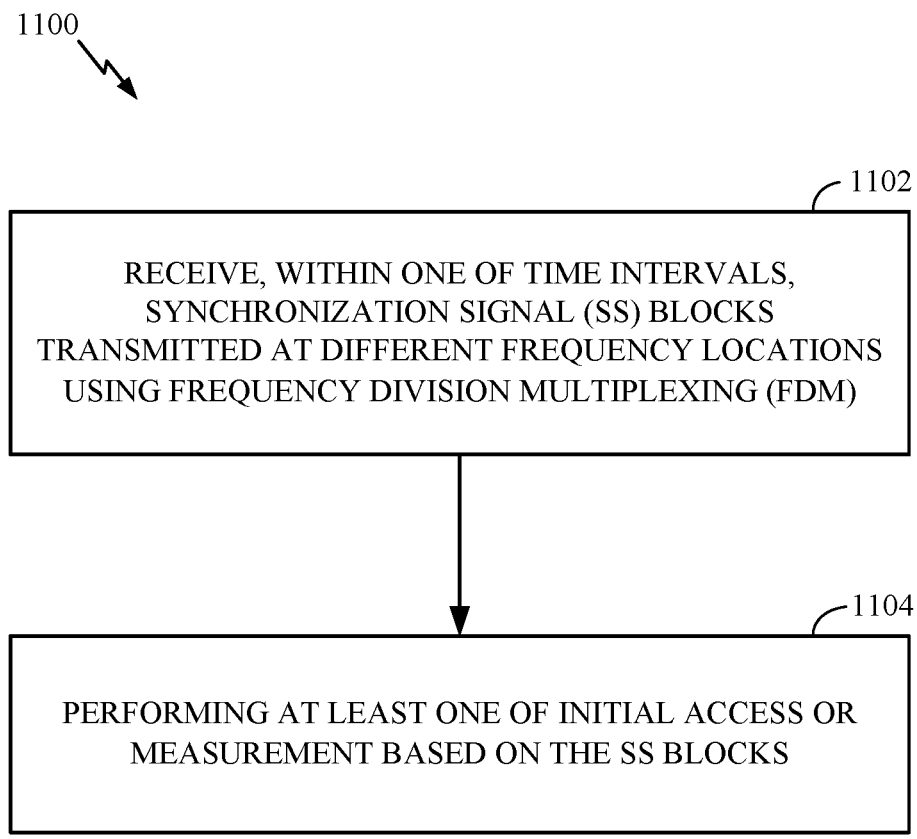
FIG. 11 illustrates example operations that may be performed by a user equipment (UE), in accordance with certain aspects of the present disclosure.

FIG. 11 illustrates example operations 1100 that may be performed by a user equipment (UE), in accordance with certain aspects of the present disclosure. Operations 1100 may be performed, for example, by a user equipment (e.g. UE 120) capable of participating in beamformed communications with a base station (e.g., a gNB) performing operations 1000 described above.

Operations 1100 begin, at 1102 by receiving, within one of time intervals, synchronization signal (SS) blocks transmitted at different frequency locations using frequency division multiplexing. At 1104, the UE performs at least one of initial access or measurement based on the SS blocks.

Figure 12:
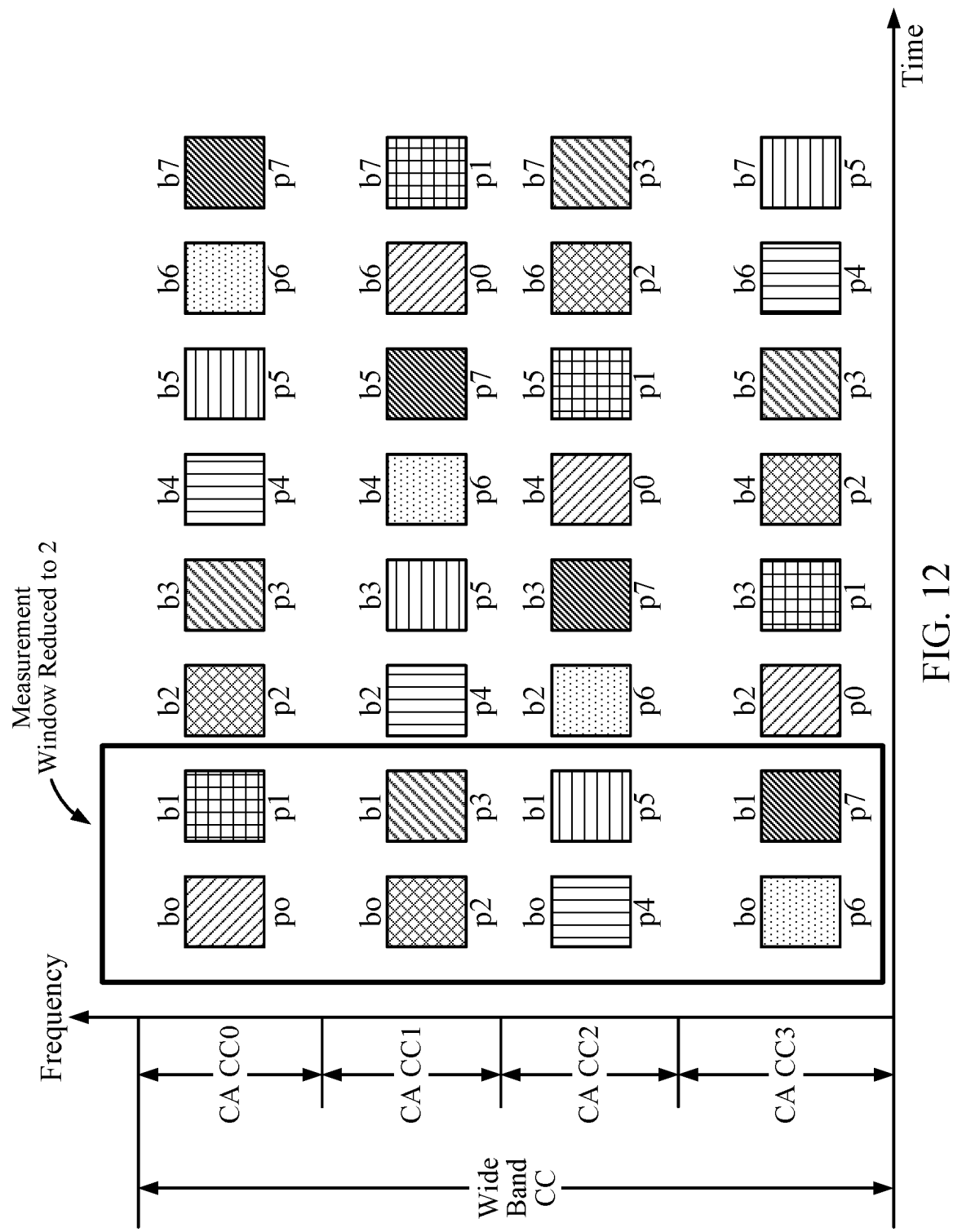
FIG. 12 is a graph illustrating an example of SS blocks being transmitted at different frequencies and times in accordance with an aspect of the present disclosure.

FIG. 12 illustrates an example graph (of frequency vs. time) that shows how FDM may be used to simultaneously transmit multiple SS blocks in different beams, and reduce a measurement window (as illustrated by the dashedbox). In the illustrated example, 8 SS blocks are sent via FDM across four component carriers (CC0-CC3).

Further, in the time scale, there are eight (8) specific SS blocks shown, namely b0, b1, b2, b3, b4, b5, b6 and b7. Each SS block is associated with a SS block index and an index of an actual beam (port) being used. In the illustrated embodiment, the eight ports (each corresponding to a different beam direction) used are p0, p1, p2, p3, p4, p5, p6 and p7.

In the example illustrated in FIG. 12, it may be assumed that the gNB has four (4) panels (the system can transmit four (4) beams at the same time). The SS block index to beam/port index is staggered during time transmission so that the gNB can transmit and finish the four (4) beams at a given time. In the staggered beam sweep of the illustrated example, SS blocks sent via different ports are staggered. Thus, in a first time interval, an SS block with index b0 may be simultaneously sent via port p0 on CC0, via port p2 on CC1, via port p4 on CC2, and via port p6 on CC3. In the next time interval, an SS block with index b1 may be simultaneously sent via port p1 on CC0, via port p3 on CC1, via port p5 on CC2, and via port p7 on CC3, Because all the ports (p0-p7) are used in time intervals b0 and b1, a UE may be able to reduce its measurement window from 8 time intervals to 2. As used herein, the term time interval may refer to a time period sufficient to transmit an SS block and its duration may be defined, for example, as a number of symbols.

The arrangements and methods provided herein may also be modified such that if a presence of a wideband UE is not present, the FDM transmissions of multiple SS blocks simultaneously may be modified or stopped.

As will be understood, the SS block transmissions may be used solely for synchronization or, in other embodiments, the signals may be used for measurements, as applicable. The network, therefore, (as shown in FIG. 8) can transmit multiple synchronization signals, such as a Primary Synchronization Signal, a Secondary Synchronization Signal or a Physical Broad Cast Channel (PBCH) signal at different frequencies. The number of frequencies can be chosen by the network and may be governed by the arrangements provided for transmission.

As shown in FIG. 12, the network can use different beams for the same SSB index at different frequencies. As discussed above, the network may also inform the UE of information the UE can use to determine what SS blocks will be transmitted using which resources. In some cases, the information may include a mapping between the SSB index and the port used. The mapping may indicate which SS blocks transmitted within a given time interval. The mapping may indicate a same SS block index is transmitted at different frequency locations using different beams within a same time interval (as shown in FIG. 12). In another embodiment, the mapping may indicate different SS blocks with different indices may be transmitted at different frequency locations using different beams within the same time interval. In any case, this information may be signaled to a UE as (cell-specific) system information (e.g., RMSI or OSI) or via UE-specific signaling (e.g., RRC signaling).

In this manner, the network may inform the UE whether simultaneous transmission of SS bocks via FDM can be used to reduce the UE measurement window. As noted above, in some cases, a UE may indicate its ability to perform wideband measurement and, in response, the network may enable simultaneous transmission of SS bocks via FDM.

As provided above, the number of beams used may vary according to specific frequency bands. In different embodiments, 4, 8 or 64 beams may be used during transmission according to current system/industry standards. Alterations from industry standards are also contemplated and are within the scope of the disclosure. Greater or lesser numbers of beams may be used while still preserving the capability to reduce UE measurement windows. For example, frequency bands above 6 GHz may be broken into further sub-sets and a corresponding number of SS blocks may be provided to these subsets, thus the embodiments provided are merely descriptive of the possibilities. In a likewise manner, the arrangements described, include the number of antennas (panels) may be increased based upon the corresponding number of SS blocks required to be processed.

As described herein, a UE may also be configured to reduce a measurement window by processing SS blocks sent via FDM using different sets of ports in different time intervals.

In some cases, in order to further enhance multiple frequency measurement, the UE may be configured with what may be referred to herein as measurement correspondence information. As used herein, measurement correspondence generally refers to the measurement of first beam index k on a first frequency (e.g., frequency 1) that can be replaced by the measurement of a second beam index j on a second frequency (e.g., frequency 2). In other words, when reporting, a UE may effectively replace the measurement of one SS block with another (based on the measurement correspondence information), rather than actually take both measurements. The measurement correspondence information may indicate two SS block measurements may be interchangeable, for example, if channel conditions experienced on those SS block transmissions is expected to be substantially the same (e.g., if it may be said those SS blocks are quasi-collocated or QCL).

In some cases, a detailed configuration (of the measurement correspondence information) may be explicitly signaled to the UE (e.g., via system information or UE specific signaling). In some cases, the detailed configuration may be implicit (e.g., specified in a standard) or a UE may be configured with a plurality of detailed configurations and may be signaled which one to use (e.g., via an index). In any case, the UE may then perform measurement of SS blocks transmitted via FDM in accordance with the configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for performing wireless communications by a network entity, comprising:
    identifying one or more time intervals for transmitting synchronization signal (SS) blocks for one or more user equipments (UEs) to use for at least one of initial access or measurement purposes;
    transmitting, within one of the time intervals, SS blocks at different frequency locations using frequency division multiplexing (FDM);
    transmitting, to the one or more UEs, information for processing the SS blocks, wherein the information indicates a mapping between SS block indices and beams; and
    signaling information to the one or more UEs to enable multiple frequency measurement according to measurement correspondence information, wherein the measurement correspondence information indicates a measurement of a first SS block sent using a first beam index on a first frequency is to be replaced by a measurement of a second SS block sent using a second beam index on a second frequency.

2. The method according to claim 1, wherein one or more of the SS blocks include at least one of a primary synchronization signal, a secondary synchronization signal, or a physical broadcast channel (PBCH).

3. The method according to claim 1, wherein the transmitting comprises:
    transmitting, within a given time interval, different SS blocks having a same SS block index at different frequency locations.

4. The method of claim 3, wherein the different SS blocks having the same SS block index are sent via different beams.

5. The method of claim 1, wherein different sets of beams are used to transmit SS blocks in different time intervals.

6. The method according to claim 1, further comprising:
receiving capability information indicating at least one of the UEs is capable of wideband processing; and
transmitting SS blocks, via multiple beams, using FDM based on the capability information.

7. The method according to claim 1, further comprising:
signaling, to the one or more UEs, that SS blocks are transmitted using FDM.

8. A method for performing wireless communications by a user equipment, comprising:
receiving, within one of time intervals, synchronization signal (SS) blocks transmitted at different frequency locations using frequency division multiplexing (FDM);
receiving signaling of information for processing the SS blocks, wherein the information indicates a mapping between SS block indices and beams; and
performing at least one of initial access or measurement based on the SS blocks, wherein the UE is configured to reduce a measurement window by processing SS blocks sent using different sets of ports in different time intervals.

9. The method according to claim 8, wherein one or more of the SS blocks include at least one of a primary synchronization signal, a secondary synchronization signal, or a physical broadcast channel (PBCH).

10. The method according to claim 8, wherein the receiving comprises: receiving, within a given time interval, different SS blocks having a same SS block index at different frequency locations.

11. The method of claim 10, wherein the different SS blocks having the same SS block index are sent via different beams.

12. The method of claim 8, wherein different sets of beams are used to transmit SS blocks in different time intervals.

13. The method according to claim 8, further comprising:
signaling capability information indicating the UE is capable of wideband processing.

14. The method according to claim 8, further comprising:
receiving signaling indicating that the SS blocks are to be transmitted using FDM.

15. The method of claim 8, further comprising:
performing multiple frequency measurement according to measurement correspondence information.

16. The method of claim 15, further comprising:
receiving signaling indicating the measurement correspondence information.

17. A method for performing wireless communications by a user equipment, comprising:
receiving, within one of time intervals, synchronization signal (SS) blocks transmitted at different frequency locations using frequency division multiplexing (FDM),
receiving signaling of information for processing the SS blocks, wherein the information indicates a mapping between SS block indices and beams; and
performing multiple frequency measurement based on the SS blocks and according to measurement correspondence information, wherein the measurement correspondence information indicates a measurement of a first SS block sent using a first beam index on a first frequency is to be replaced by a measurement of a second SS block sent using a second beam index on a second frequency.

18. An apparatus for performing wireless communications by a network entity, comprising:
means for identifying one or more time intervals for transmitting synchronization signal (SS) blocks for one or more user equipments (UEs) to use for at least one of initial access or measurement purposes;
means for transmitting, within one of the time intervals, SS blocks at different frequency locations using frequency division multiplexing (FDM),
means for transmitting, to the one or more UEs, information for processing the SS blocks, wherein the information indicates a mapping between SS block indices and beams; and
means for signaling information to the one or more UEs to enable multiple frequency measurement according to measurement correspondence information, wherein the measurement correspondence information indicates a measurement of a first SS block sent using first beam index on a first frequency to be replaced by a measurement of a second SS block sent using a second beam index on a second frequency.

19. An apparatus for performing wireless communications by a user equipment (UE), comprising:
means for receiving, within one of time intervals, synchronization signal (SS) blocks transmitted at different frequency locations using frequency division multiplexing (FDM);
means for receiving signaling of information for processing the SS blocks, wherein the information indicates a mapping between SS block indices and beams; and
means for performing at least one of initial access or measurement based on the SS blocks, wherein the UE is configured to reduce a measurement window by processing SS blocks sent using different sets of ports in different time intervals.

* * * * *